United States Patent [19]

Mason

[11] Patent Number: 4,675,744
[45] Date of Patent: Jun. 23, 1987

[54] SCANNING SYSTEM
[75] Inventor: Harry L. Mason, Nototon, Conn.
[73] Assignee: Pitney Bowes Inc., Stamford, Conn.
[21] Appl. No.: 686,361
[22] Filed: Dec. 26, 1984
[51] Int. Cl.[4] .............................................. H04N 1/40
[52] U.S. Cl. .................................... 358/282; 358/284; 382/54
[58] Field of Search ............... 358/212, 213, 282, 163, 358/174, 284; 382/50, 54, 52

[56] References Cited
U.S. PATENT DOCUMENTS
4,525,741 6/1985 Chahal et al. ........................ 358/212

4,589,034 5/1986 Yokomizo ........................... 358/282

Primary Examiner—Edward L. Coles, Sr.
Attorney, Agent, or Firm—Peter Vrahotes; Melvin J. Scolnick; David E. Pitchenik

[57] ABSTRACT

A circuit for a linear camera scanning system converts a linear output to binary bits representing the contrast levels of the picture elements scanned and compares these to be a background level to produce a more accurate representation. The scanning system eliminates the high number of adjustments required in prior systems and sequences binary information so they may be output in a preferred sequential order.

7 Claims, 9 Drawing Figures

SCANNING SYSTEM

BACKGROUND OF THE INVENTION

This invention is in the field of scanning systems of the type where light is directed upon a medium, such as an envelope containing a mailing address, and reflected from a surface so that there is irregular reflectance. Alternatively, light may be directed towards a film with light passing through the transparent portions thereof to obtain an image through irregular transmission. The scanning system may be used with a processor wherein a determination is made as to the image or text that is contained on or within the medium. An example of such a scanning system is one in which light is reflected from a document containing text and reflected onto a plurality of light transducers, such as photocells or charge couple devices. Each light transduced receives light reflected from an individual picture element (pixel) being scanned at a given instant. Analog signals are received from the individual transducers and are converted to digital signals before being sent to a logic processor that performs a series of steps to determine whether the signals represent black (no light reflected) or white (light reflected) pixels. By processing all the signals, the text on the document can be determined by the processor.

Certain prior art scanning systems used a retina consisting of a two dimensional distribution of photocells and would simultaneously receive the entire image of a character to be recognized. This normally required a static system in which the document would be placed under the retina so as to assure appropriate alignment between the character to be identified and the retina. These systems had the disadvantage of being too slow. More recently, dynamic scanning systems have been developed wherein documents may be conveyed past a plurality of linearly aligned photocells forming a single row. The single row of photocells were usually divided into several sections in order to overcome time response limitations of the photocells. For example, a 512 photocell linear array would be divided into eight units of 64 photocells each. Doing so resulted in two disadvantages. The first disadvantage had to do with the high number of adjustments or calibrations that were required for the many amplifiers in such a system. In addition, a program had to be established in the processor receiving the output of the scanning system to orient the signals in their proper sequence because of the original division into eight groups of 64. The information received from the 512 photocells by the processor would be in the sequence of the signal from the first photocell being received, the top photocell, then the signal would be received from 65th photocell, then the 129th, 193rd, 257th, 321st, 385th, 449th, 2nd, 66th, 130th, 194th and so forth, these numbers representing the photocells from the top of this array, No. 1, to the bottom of the array, number 512. The processor was required to resequence these numbers into the proper order 1, 2, 3, 4 . . . 512 in order to process the information contianed by these signals and identify the characters being presented. This obviously took capacity of the processor and was time consuming.

SUMMARY OF THE INVENTION

A scanning system has been devised whereby calibration or adjustments of the amplifiers in this system are substantially reduced. This is achieved by the supplying of picture element (pixel) information through a reduced number of channels in conjunction with a clamping circuit. With such a combination, a multiplexer may be used for conveying information directly to the processor sequentially, thereby not requiring capacity of the processor and reducing processing time.

DETAILED DESCRIPTION OF THE PREFERRED EMBODIMENT

Figure 1:
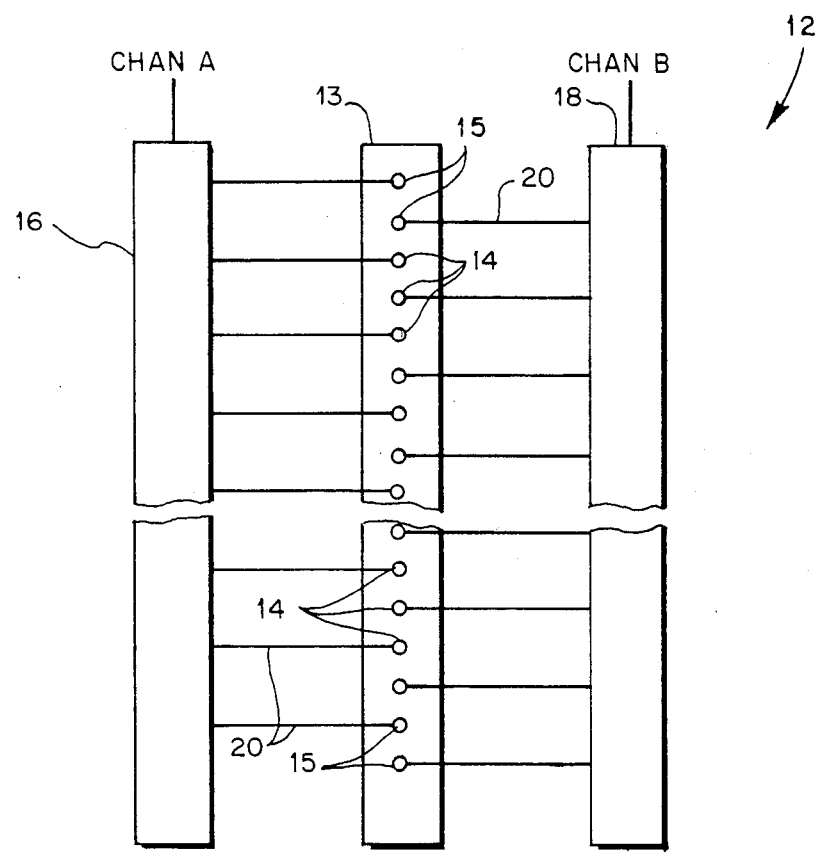
FIG. 1 shows a plan view of the basic elements of a reading head that may be used in the instant invention.
Figure 2:
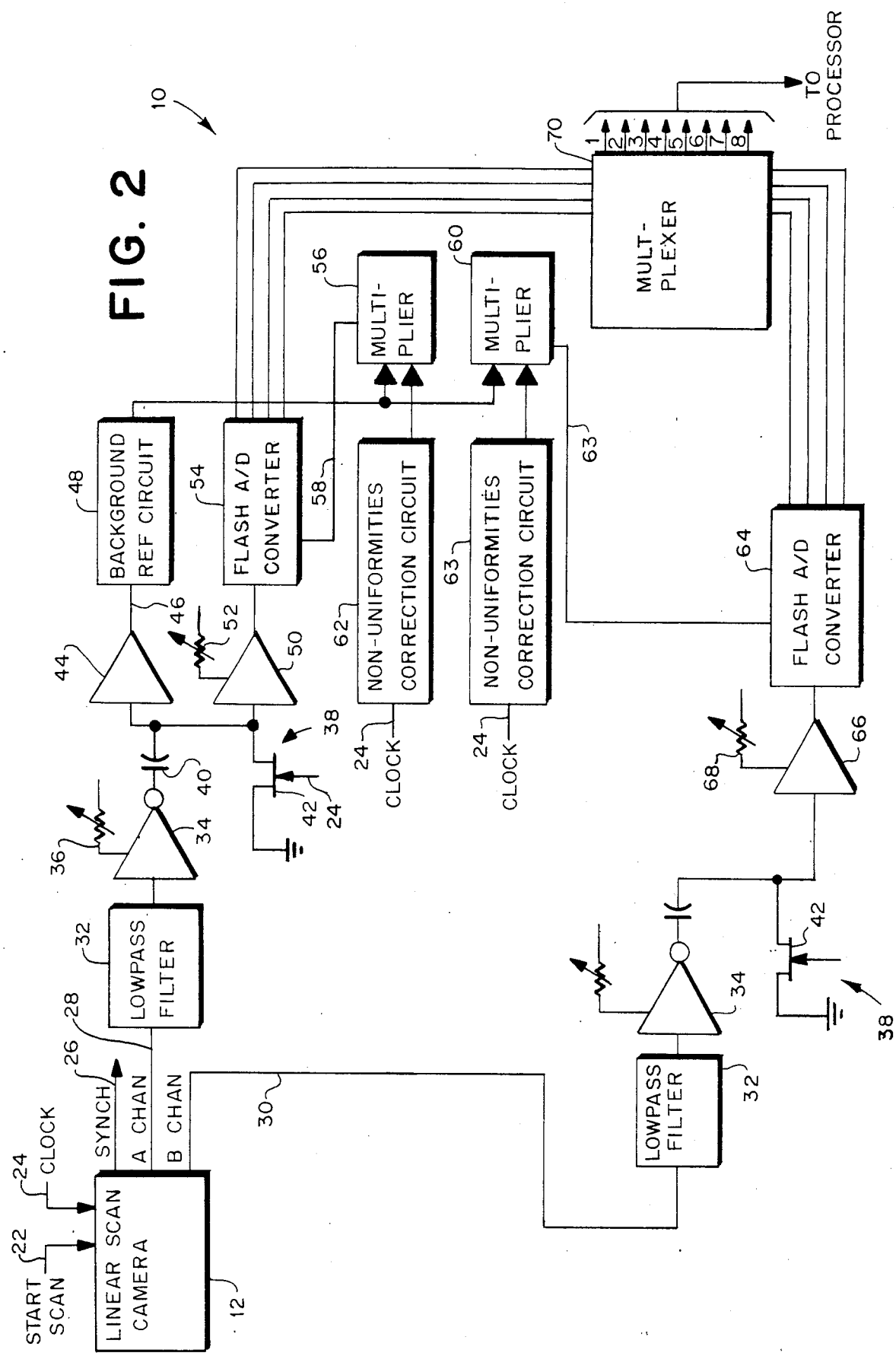
FIG. 2 shows a block diagram of a circuit that incorporates the instant invention.
Figure 3A:
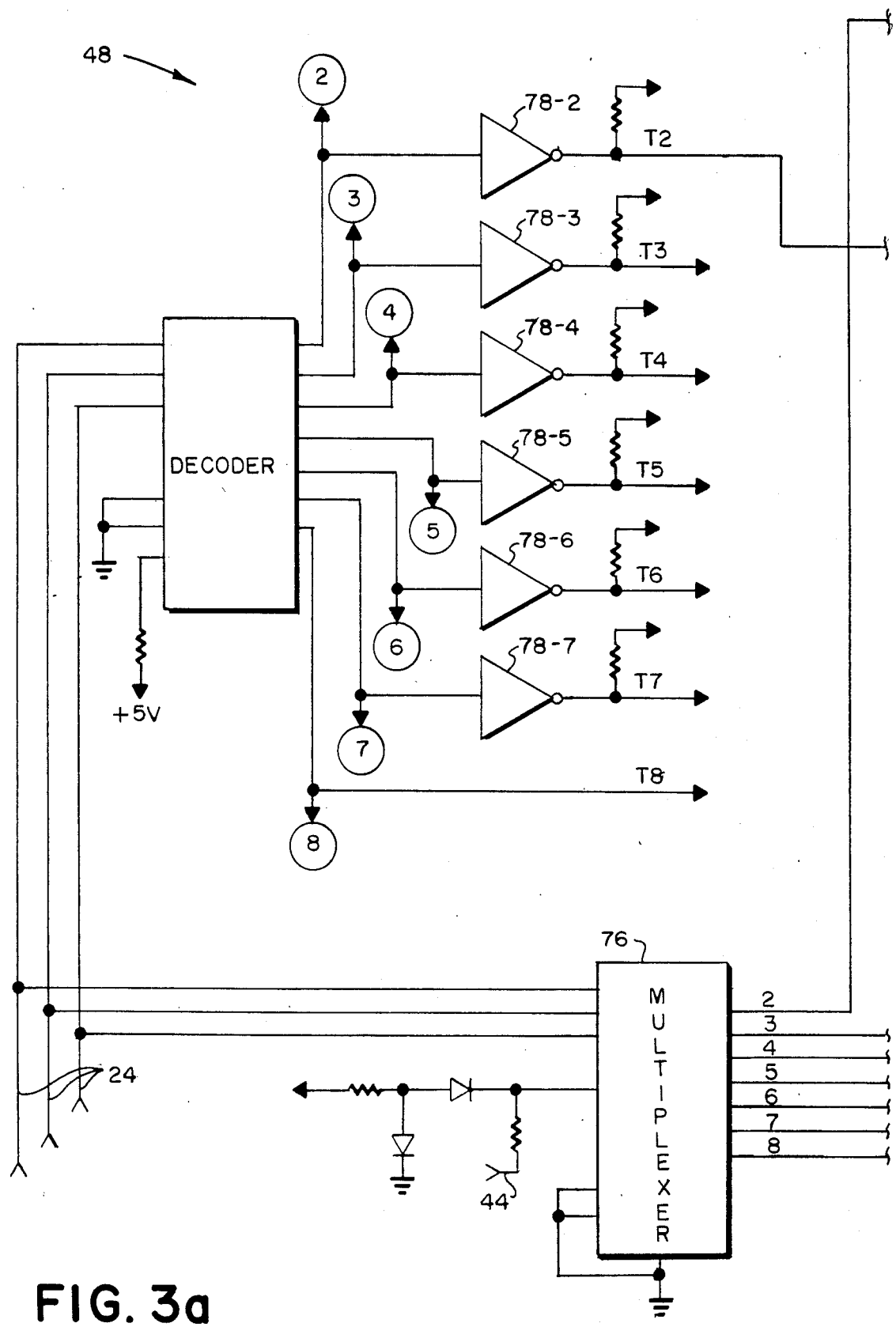
FIGS. 3a–d are schematic diagrams showing the details of the background reference circuit shown in FIG. 2.
Figure 3B:
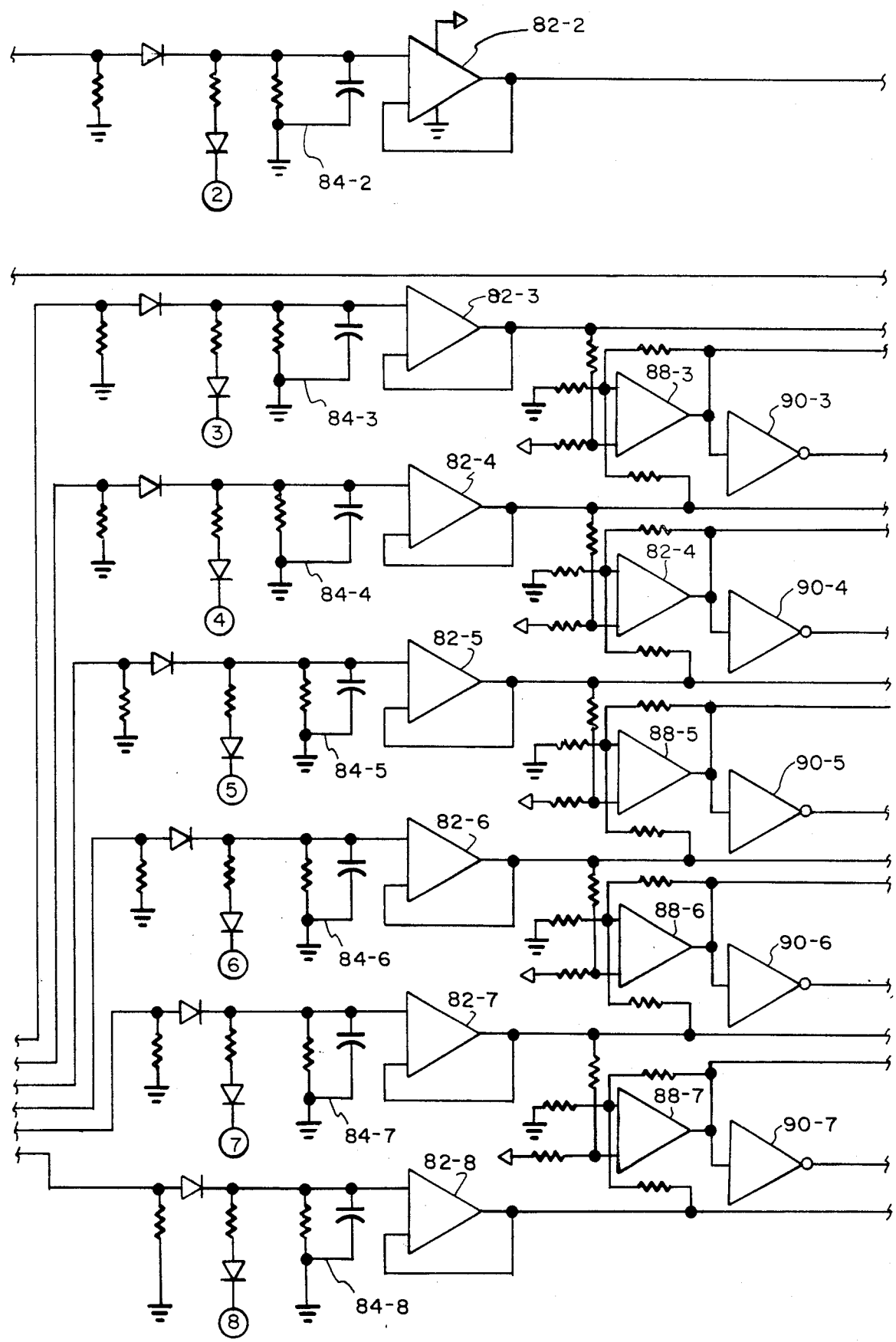
Figure 3C:
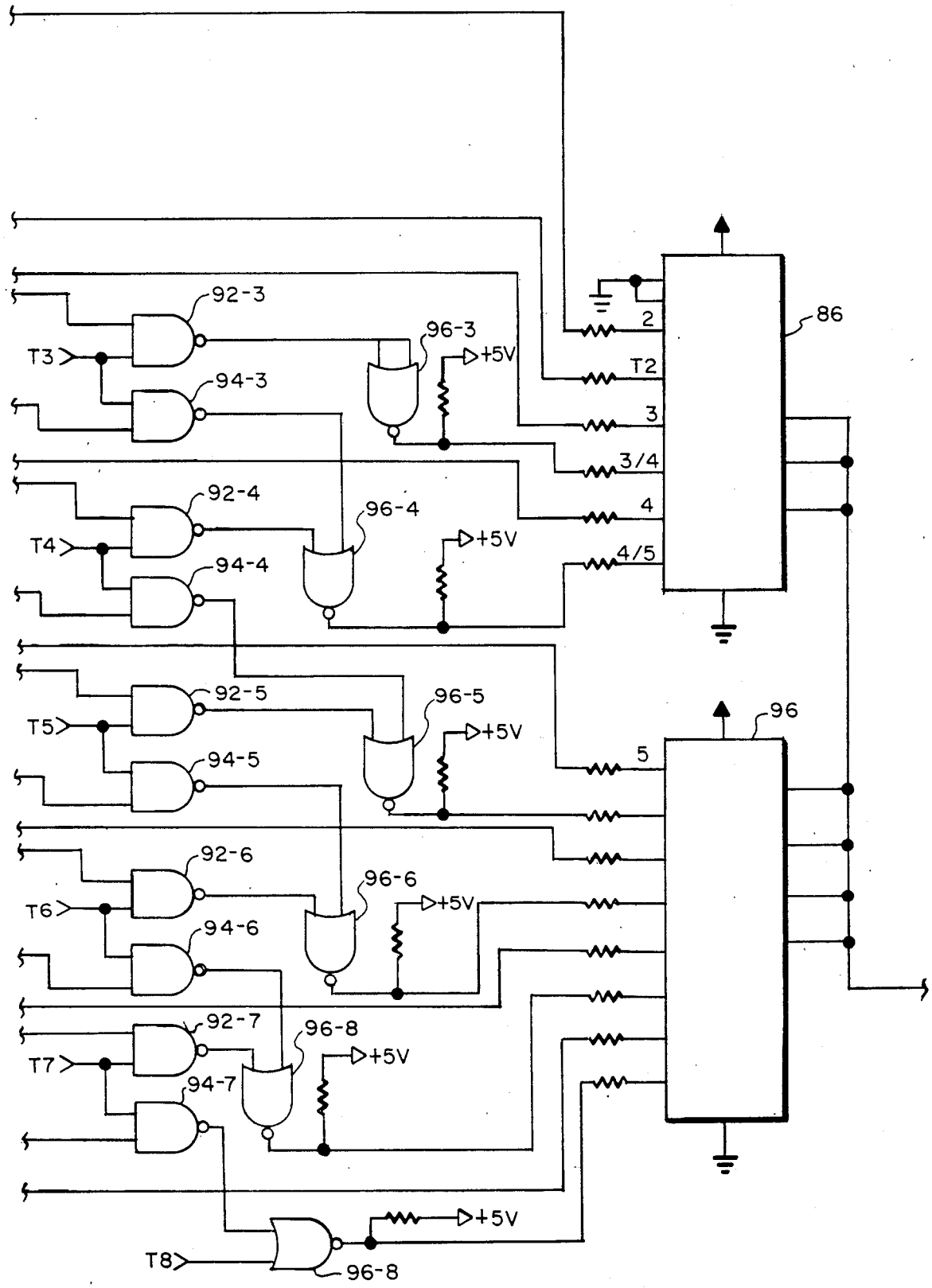
Figure 3D:
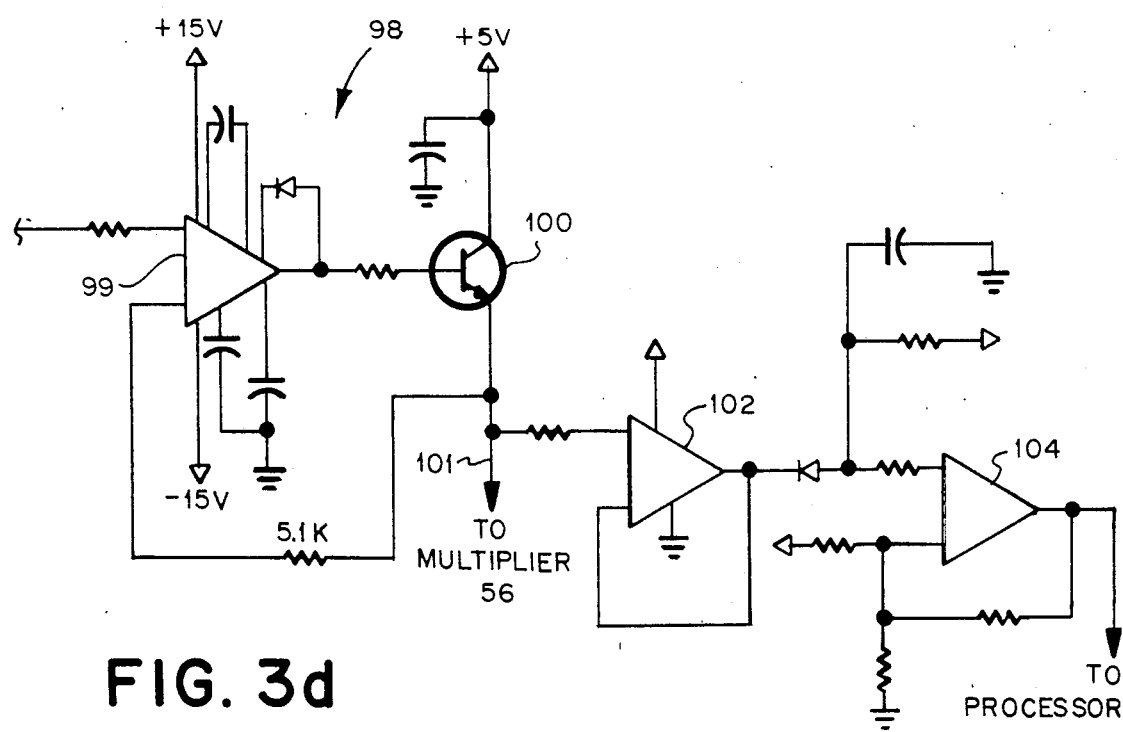

Referring initially to FIGS. 1 and 2, a scanning system is shown generally at 10 and includes a linear scan camera 12 such as a Fairchild linear scan camera model CCD-1200R5-72 commercially available from Fairchild Camera Company of Palo Alto, Calif. The camera 12 has a linear array 13 of light transducers 14 such as charge couple devices or photocells, hereinafter referred to collectively as photocells, and a pair of registers 16, 18 are arranged on opposite sides of the array. For the purposes of description, it will be assumed that the linear array has 512 active photocells 14 and two dark reference photocells 15 located on opposite ends of the 512 active photocells for a total of four. It will be appreciated that "dummy" cells are included in such devices, i.e., cells that are not active; because they are not relevant to the instant invention they will not be discussed. Leads 20 connect alternative ones of the active photocells 14 with the registers 16, 18 such that the odd photocells 1, 3, 5 . . . 255, counting from the top down, are connected to the first register 16 and the even numbered photocells 2, 4, 6, 8 . . . 512 are connected to the second register 18. A first channel A leads from the register 16 and a second channel B leads from the register 18 for conveying analog signals that are generated by the photocells 14. To avoid confusion, the odd and even distribution description contained throughout this specification does not include the dark reference cells 15 which also have half the outputs received by the register 16 and half by register 18 through the leads 20.

The camera 12 is provided with a start scan 22 and a clock 24 such that analog signals in the form of packets are transferred in parallel to the two registers 16, 18 in response to the start scan signal 22 and a time clock signal 24 acting on the camera 12. A synchronization signal 26 is output from the camera 12 to synchronize the components of this scanning system 10 (connections not being shown for convenience). A low-pass filter 32 is connected to the camera 12 by the A channel 28. Downstream from the low-pass filter 32 is an amplifier 34 that has a variable resistor gain adjustment 36. Downstream from the amplifier 34 is a clamp circuit 38 made up of a capacitor 40 that is directly connected to the output of the amplifier 34 and a transistor 42 that is connected to ground. The gate of the clamp transistor 42 is connected to a timing signal 24 which enables the transistor when the background reference outputs occur at the output of the amplifier 34. An amplifier 44 is connected to the output of the clamp circuit 38, and the output of this amplifier 44 is directed to a background reference circuit 48. Another amplifier 50 with an adjustable resistor 52 for output offset adjustment is also connected to the output of the clamp circuit 38 and the output of this amplifier goes to a flash analog to digital (A/D) converter 54. A first multiplier 56 receives the output from the background reference circuit 48 and the output from a non-uniformities correction circuit 62 and has an output reference feedback 58 connected to the A/D converter 54. A second multiplier 60 receives the outputs of both the background reference circuit 48 and a second non-uniformity correction circuit 63. It will be appreciated that although two non-uniformities correction circuits are shown, if convenient only one may be included if a high speed PROM is used. The second multiplier 60 is connected to send a feedback reference signal 65 to another A/D converter 64. The A/D converter 64 receives the signals from the B channel 30 after appropriate filtering 32, amplification 34, clamping 38 and further amplification 50, the units for accomplishing these functions being identical to those units in the A channel and the description of such units will, therefore, not be repeated. A multiplexer 70 receives the outputs from the A/D converters 54, 64 which outputs are represented as a four-bit binary code.

In operation, light is reflected from a document onto the photocells 14 and the linear scan camera 12 integrates the light and accumulates charges. Upon a start scan 22 pulse being received, the array 13 dumps all the accumulated charges into the shift registers 16, 18 including the dark reference levels which precede and follow the 512 levels from the active photocells 14. The first register 16 receives the output from the odd photocells 14 counting, every other photocell from the top of the array downwardly, i.e., 1, 3, 5, 7 ... 511. The second register 18 receives all the outputs from the even photocells 2,4,6,8 ... 512. These registers also receive the outputs from the dark cells 15. Each of these registers 16, 18 sends its respective signals in response to timing signals 24 to filters 32 and subsequently to the amplifiers 34. Downstream from the amplifiers 34 is the clamp circuit 38 wherein the signals output by the amplifiers 34 at the dark level response times are clamped to a specific level as a result of the transistors 42 being made conductive by the timing signals 24 received through the gates of the transistors. The charged signals are then amplified by the amplifiers 44. The background reference circuit 48 receives the output from the amplifier 44 and integrates areas of the document being scanned for background determinations. Since normally there is little printing on a document, almost all of the document will be background, however, the background may be non-uniform due to artistic designs or color variations. As a consequence, the total scan may be divided into a number of segments, seven in this system as can be seen in FIGS. 3a to 3d, with a background level integrated for each segment. The background signals generated by the reference circuit 48 are sent to the multipliers 56, 60 which in turn send modified signals to the A/D converters 48, 54, these modified signals being derived in conjunction with the non-uniformity correction circuits 62, 63 described below. The A/D converter 54 sees individual pulses, as received from the amplifier 50, and compares them to the modified signal received from the multiplier 56. Upon comparison with this modified signal, it will make a decision as to the level of signal to be transmitted and transmit a four bit code to the multiplexer 70 indicative of the intensity of the pixel that signal represents.

The non-uniformity correction circuits 62, 63 connected to the multipliers 56, 60, respectively, contain a matrix of locations representative of all the active photocells 14 in the array 13. Prior to operation of the scanning system 10, the output of the photocells are tested for response to a constant light source and the output level of each photocell will be calibrated as a result of being exposed to such a light source. This hereinafter is referred to as a performance variation of the photocells. As a result of this test, a correction factor will be obtained. This correction factor is placed into the locations of the correction circuits 62, 63 so that the signals received from each of the photocells 14 will be a true representation of the amount of light that is incident or reflected thereon. More specifically, the correction circuits 62, 63 compensate for tolerances of the photocells 14. The outputs from the correction circuits 62, 63 are sent to the multipliers 56, 60, respectively, so that the A/D converters 54, 64 will receive signals modified by the background reference as well as the non-uniformity corrections.

The multiplexer 70 will receive the signals generated by the odd photocells from the first A/D converter 54 and will receive the signals generated by the even photocells 14 from the second A/D converter 64. The multiplexer 70 will then arrange the signals in proper sequence, i.e., 1,2,3,4 ... 512, or other suitable order as required by the processor in which character or pattern recognition is to take place.

Referring now to FIGS. 3a to 3d, details of the background reference circuit 48 shown in FIG. 1 will be given. Timing signals 24 are received by a decoder 74 that is connected to ground and receives a driving voltage of five volts. The decoder 74 has seven outputs, six of which, 2-7, lead to inverters 78-2 to 78-7, the outputs of these inverters being indicated as timing signals T2 to T7. In addition, the seven outputs from the decoder 74 are directed to circuitry containing isolation amplifiers 82-2 to 82-8. Each of these amplifiers 82-2 to 82-8 has an RC circuit 84-2 to 84-8 respectively, associated therewith. The seven outputs 2-8 of the decoder 74 are directed to the input of each of the RC circuits 84-2 to 84-8, respectively. The amplifiers 82-2 to 82-8 receive the outputs 1-8 from an analog multiplexer 76 which is connected to the timing signals 24. The outputs of the multiplexer 76 are received by the isolation amplifiers 82-2 to 82-8. The outputs of the amplifiers 82-2 to 82-4 are connected to a multiplexer 86. The timing outputs T2-T4, from the inverters 78-2 to 78-4, are also received directly by the multiplexer 86. The outputs of amplifiers 82-5 to 82-8 are connected to another analog multiplexer 96.

The output from the amplifier 82-3 is not only sent to the multiplexer 86 but also to one of the inputs of a comparator 88-3. The comparator 88-3 also receives the output from the amplifier 82-4. The output from the comparator 88-3 is transmitted to a NAND gate 92-3 that compares the output from the amplifier 88-3 with the output T3 from the inverter 78-3 and selects the lower value and sends this signal to a NOR gate 96-3 which in turn sends an inverted signal to the multiplexer 86. A similar output is supplied from a NAND gate 94 to a NOR gate 96-4. The NOR gate 96-4 also receives the output from a NAND gate 92-4, the latter NAND gate having received the output from the amplifier 88-4 and the output T4 from inverter 78-4. In this way, a comparison is made between the outputs 3 and 4 of the multiplexer 76 and the lower level is selected at the multiplexer 86. This comparison technique from one channel to the subsequent one is continued in the balance of the comparators 88-5 to 88-7 and in each instance the lower level is selected by the respective multiplexers 86, 96.

The multiplexers 86, 96 selectively serially output these signals on a common output line to a driving amplifier 98 that includes an operational amplifier 99 and a transistor 100. This driving amplifier 98 drives a background level output bus 101 and the amplifier 102. The amplifiers 102, 104 act as a time delay that reject noise and indicates detection of envelopes that are being conveyed past the camera 12. The output of amplifier 104 supplies a starting signal which subsequently sends the information to the processor as indicated. The signal from the amplifier 104 goes to the processor and tells the processor to count the number of scans for the starting of information processing. In addition to having information sent to the processor, additional information is sent from transistor 100 to the multiplier 56. Thus, what has been shown is a circuit whereby the outputs from the various groups of photocells are received and compared against one another and the level is maintained throughout at the lowest level received when compared from one group of photocells to another.

Figure 4:
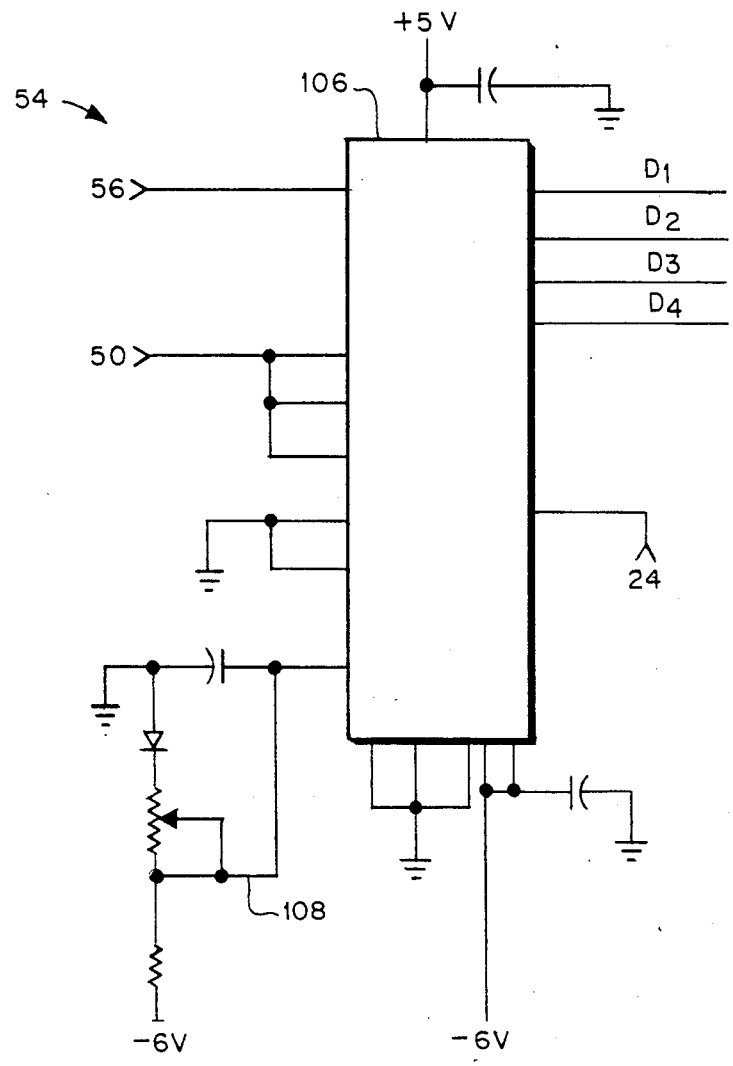
FIG. 4 is a schematic diagram showing details of one of the flash A/D converters shown in FIG. 2.

Referring now to FIG. 4, details are shown of the A/D converter 54 shown in FIG. 1. The A/D converter includes a chip 106, such as TRW Model No. TDC 1014, available from TRW Corp., Cleveland, Ohio, that receives the output from the amplifier 50 of the A channel, the output of the multiplier 56, a driving voltage of five volts, and timing signals 24. An RC circuit 108 provides a reference level for the chip 106. As a consequence, the chip 106, by receiving the output of the A channel and the multiplier 56 in conjunction with the timing signals 24, converts the analog signal received from channel A to a digital signal after it has been modified by the information from the background circuit 48 via the multiplier 56. The outputs D1 to D4 supply digital information in the form of a four-bit code to the demultiplexer 70.

Figure 5:
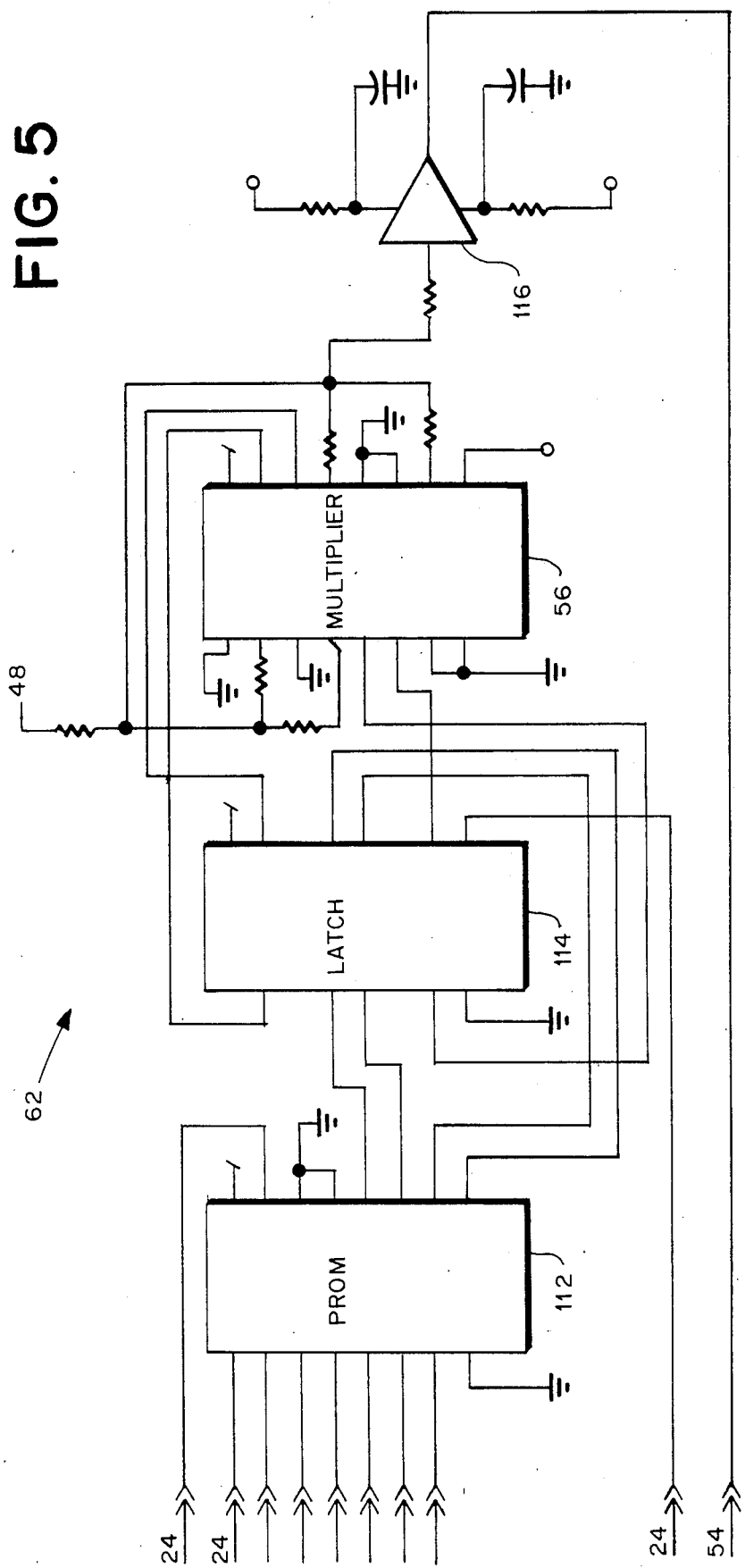
FIG. 5 is a schematic diagram showing details of a non-uniformity circuit shown in FIG. 2.

Referring now to FIG. 5, the non-uniformities correction circuit 62 is shown in greater detail. This circuit includes a PROM 112 that stores information relative to the variations in the output of the photocells 14 of the array 13. The input into the PROM 112 provides write addresses generated by the clock 24. The outputs from the PROM 112 are received by a latch 114 that stores the non-uniformity information of the various photocells 14. The latch 114 is connected to the multiplier 56 that acts as a switch for variable attenuation. The output from the multiplier 56 is connected to a driving amplifier 116 whose output is connected to the A/D converter 54 as seen in FIG. 4.

Figure 6:
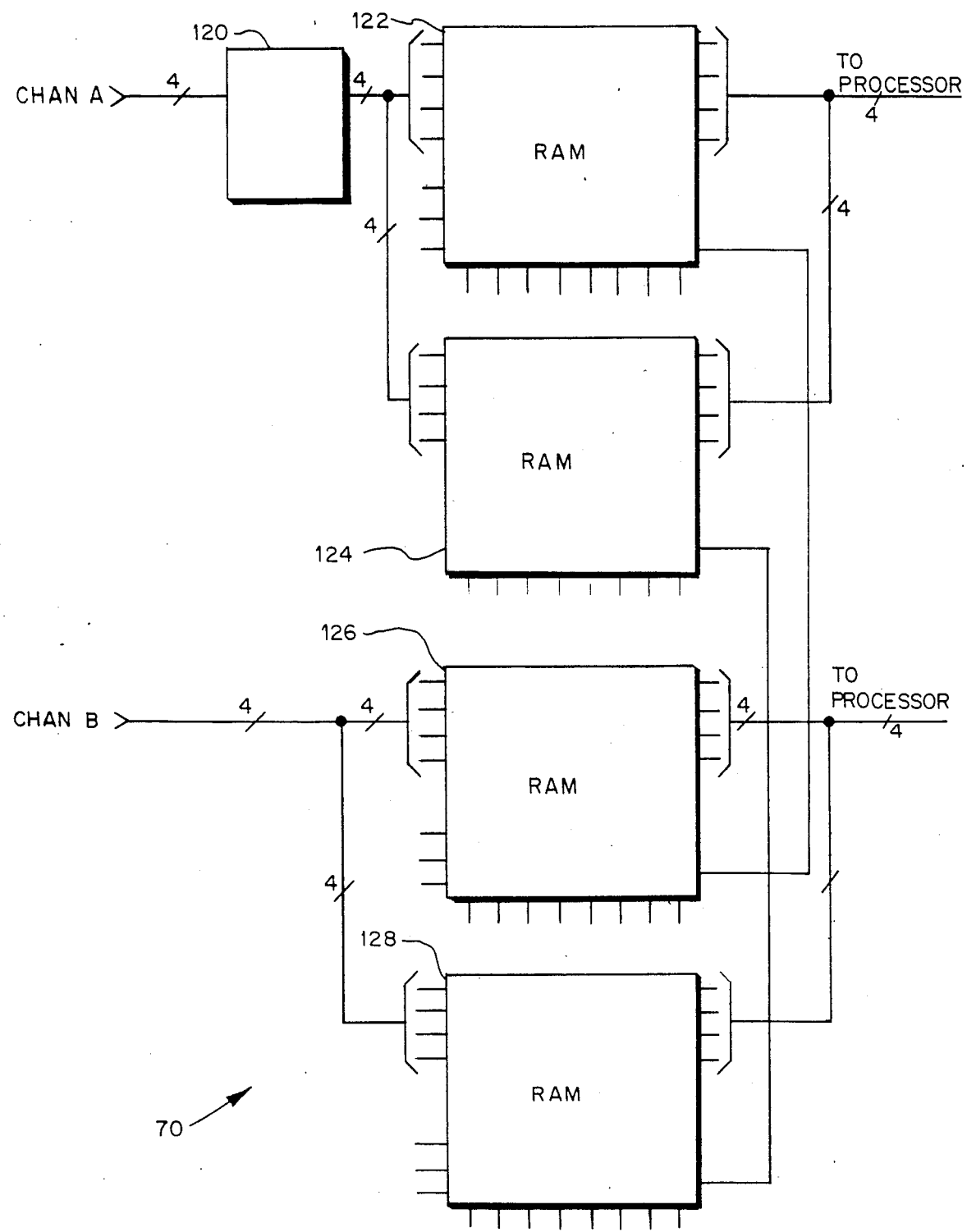
FIG. 6 is a schematic diagram showing the multiplexer shown in FIG. 2.

Referring now to FIG. 6, details are shown of the multiplexer 70. The output from channel A is received by a delay circuit 120 whose output is connected to a pair of RAMS 122, 124. The output of channel B is connected to another pair of RAMS 126, 128. The output from the RAMS 122, 124, 126 and 128 lead to the processor as indicated in FIG. 2. The function of the delay circuit 120 is to allow information from the A channel to be coincident with the B channel in order that a common clock 24 may be used since the camera 12 outputs from the channels A,B are in a staggered overlap sequence.

As a consequence of the above scanning system 10, the number of amplifiers 34 requiring critical adjustment is reduced and the dark level drift is automatically compensated. Photocell 14 response and non-uniformity problems associated with previous systems that required high cost selection of photodiode arrays is corrected by the utilization of relatively low cost components that results in more accurate output response levels.

What is claimed is:

1. A scanning circuit comprising:
a linear array of light transducers;
a plurality of registers;
each of said registers being connected to a group of said light transducers to receive outputs therefrom;
a first amplifier connected to each of the outputs of said registers;
a clamp circuit connected to the output of each of said amplifiers;
second amplifiers connected to the output of each of said clamps;
a third amplifier connected to the output of one of said clamps;
an A/D converter connected to the output of each of said second amplifiers;
a background reference circuit connected to said third amplifier;
a multiplier connected to one of said A/D converters and to said reference background circuit;
and a multiplexer connected to the A/D converters.

2. The scanning circuit of claim 1 including means for individually adjusting the gains on said first and second amplifiers.

3. The scanning circuit of claim 1 including means for correcting for non-uniformity output in said transducers.

4. A scanning circuit comprising:
a linear array of light transducers;
a pair of registers;
a first of said registers connected to alternating ones said light transducers to receive output signals therefrom;
the second of said registers being connected to the remaining alternative ones of said light transducers to receive output signals therefrom;
a pair of first amplifiers each connected to the output of one of said first and second registers;
a pair of clamp circuits each connected to the output of each of one of said first amplifiers;
second amplifiers connected to the output of each of said clamp circuits;
a third amplifier connected to the output of one of said clamp circuits;
a background reference circuit connected to the output of said third amplifier;
an A/D converter connected to the output of each of said second amplifiers;
multiplier means connected to said reference circuit and to said A/D converters; and
a multiplexer connected to the A/D converters.

5. The scanning circuit of claim 4 including a pair of non-uniformities correction circuits, a pair of multipliers each connected to receive the output of a said non-uniformities correction circuit and said background reference circuit, each of said multipliers being connected to one of said A/D converters to send a reference signal that is derived from said non-uniformities correction circuit and said background reference circuit.

6. A scanning system comprising:
a linear array of light transducers;
means for receiving the output of a first portion of said light transducers;
means for receiving the output of a second portion of said light transducers;
means for clamping the output of each of said transducers to a control level;
means for amplifying the output of each of said light transducers;
means for correcting the outputs of said light transducers for non-uniformity in performance of said light transducers in at least one of said portions;
means for converting said corrected outputs from an analog signal to a digital signal; and
means for receiving digital signals representative of the outputs of said two portions and placing them in a sequential order.

7. The scanning system of claim 6 wherein the light transducers of said first portion are alternative ones of said array and said light transducers of said second portion are the remaining.

* * * * *